United States Patent
La Fata

(10) Patent No.: US 9,866,319 B2
(45) Date of Patent: Jan. 9, 2018

(54) SYSTEM AND METHOD FOR ESTABLISHING A FREE SPACE OPTICAL LINK WITHOUT GIMBALED OPTICS

(71) Applicant: The Boeing Company, Chicago, IL (US)

(72) Inventor: Christopher M. La Fata, Berkeley, MO (US)

(73) Assignee: THE BOEING COMPANY, Chicago, IL (US)

(*) Notice: Subject to any disclaimer, the term of this patent is extended or adjusted under 35 U.S.C. 154(b) by 214 days.

(21) Appl. No.: 14/840,953

(22) Filed: Aug. 31, 2015

(65) Prior Publication Data
US 2017/0063453 A1 Mar. 2, 2017

(51) Int. Cl.
*H04B 10/00* (2013.01)
*H04B 10/112* (2013.01)
*H04J 14/00* (2006.01)

(52) U.S. Cl.
CPC .................. *H04B 10/112* (2013.01)

(58) Field of Classification Search
CPC ... H04B 10/11; H04B 10/112; H04B 10/1123; H04B 10/1125; H04B 10/1129; H04B 10/114; H04B 10/1143
See application file for complete search history.

(56) References Cited

U.S. PATENT DOCUMENTS

| | | | |
|---|---|---|---|
| 2006/0018661 A1 | 1/2006 | Green et al. | |
| 2007/0031150 A1 | 2/2007 | Fisher et al. | |
| 2007/0031151 A1 | 2/2007 | Cunningham et al. | |
| 2012/0177376 A1* | 7/2012 | Chang | H04B 10/112 398/115 |
| 2014/0376914 A1 | 12/2014 | Miniscalco | |
| 2016/0072580 A1* | 3/2016 | Wabnig | H04B 10/70 398/131 |

OTHER PUBLICATIONS

European Patent Office; Extended European Search Report; European Patent Application No. 16184284.4 dated Dec. 12, 2016.

* cited by examiner

*Primary Examiner* — Daniel Dobson
(74) *Attorney, Agent, or Firm* — Parsons Behle & Latimer

(57) ABSTRACT

A method and system for establishing a free space optical link that includes creating a first link between a first vehicle and a second vehicle and pointing a laser from the first vehicle to the second vehicle. The method includes steering the laser in a spiral pattern and recording a time at the first vehicle of each incremental position of the laser in a spiral pattern. The method includes detecting the laser at the second vehicle, recording the time of detection at the second vehicle, and steering the laser to the positions that coincide with the detection times of the second vehicle to establish an optical link between the first and second vehicles. The first link may be a RF link. The free space optical link may be created with a conformal panel having an RF array, an optical detecting aperture, and an optical beam directing aperture.

10 Claims, 2 Drawing Sheets

SYSTEM AND METHOD FOR ESTABLISHING A FREE SPACE OPTICAL LINK WITHOUT GIMBALED OPTICS

FIELD OF THE DISCLOSURE

The embodiments described herein relate to a system and method of establishing a free space optical link without gimbaled optics.

BACKGROUND

Description of the Related Art

A communications link between moving vehicles, such as aircraft, can be difficult to establish in a secure manner. Security of the link may be important if the aircraft are military aircraft. A radio frequency (RF) link can be established, but such a link may be susceptible to interception if a third party happens to scan the frequency being used for the link.

An optical link between two moving vehicles, such as aircraft, may be more secure option. However, creating a free space optical link present some challenges due to the movement of the aircraft. The optical beam is much smaller than the beam of an RF link making it more difficult to point the optical beam to the appropriate location on the exterior of an aircraft. Gimbaled optics have been used in the past to point the optical beam, such as a laser, to a platform. However, in order to properly communicate between both vehicles, both platforms need to use gimbaled optics. The moving parts of gimbaled optics may lead to the gimbaled optics as being unreliable as well as being expensive. Further, it may take significant time durations for the detection, acquiring, and tracking of the vehicles via the movement of the gimbaled optics. Other disadvantages of using gimbaled optics may exist.

SUMMARY

The present disclosure is directed to methods and systems that overcome some of the problems and disadvantages discussed above.

One embodiment is a method of establishing a free space optical link comprising creating a first link between a first vehicle and a second vehicle and pointing a laser from the first vehicle to the second vehicle. The method comprises steering the laser in a pattern and recording a time at the first vehicle of each incremental position of the laser in the pattern. The pattern may be a spiral pattern. The method comprises detecting the laser at the second vehicle, recording the time of detection at the second vehicle, and steering the laser to the positions that coincide with the detection times of the second vehicle to establish an optical link between the first and second vehicles. The first link may comprises a RF link.

The method may comprise indicating a time and a position of each of the first and second vehicles over the RF link prior to steering the laser in the spiral pattern. Indicating the position of each of the first and second vehicles over the RF link may further comprise the first vehicle determining its position based on a virtual 3D model and the second vehicle determining its position based on a virtual 3D model. The method may comprise transmitting the detection times of the laser from the second vehicle to the first vehicle over the RF link prior to steering the laser to the positions that coincide with the detection times of the second vehicle.

The method may comprise confirming detection of the laser by the second vehicle at the positions that coincide with the detection times over the RF link prior to establishing the optical link. When the second vehicle cannot confirm detection of the laser over the RF link, the method may comprise repeating the steps of steering the laser in the spiral pattern, recording the time of each incremental position of the laser in the spiral pattern, detecting the laser at the second vehicle and recording the time of detection, transmitting the detection times of the laser from the second vehicle to the first vehicle over the RF link, and steering the laser to the positions that coincide with the detection times transmitted from the second vehicle until the first vehicle receives confirmation of detection of the laser by the second vehicle over the RF link. The method may comprise disconnecting the RF link between the first and second vehicles. The method may comprise transferring data between the first and second vehicles over the optical link. The first and second vehicles may be aircraft.

One embodiment is a system to establish a free space optical link comprising a first vehicle having at least one conformal panel on an exterior of the first vehicle, the at least one conformal panel comprising at least one RF array, at least one optical detection aperture, and at least one optical beam directing aperture. The system comprises a second vehicle having at least one conformal panel on an exterior of the second vehicle, the at least one conformal panel comprising at least one RF array, at least one optical detection aperture, and at least one optical beam direction aperture, wherein a RF link may be established between the at least one conformal panel of the first vehicle and the at least one conformal panel of the second vehicle, and wherein an optical link may be established between the at least one conformal panel of the first vehicle and the at least one conformal panel of the second vehicle.

The system may comprise a first processor on the first vehicle, the first processor in communication with a virtual 3D model and in communication with the at least one RF array, the at least one optical detection aperture, and the at least one optical beam direction aperture of the at least one conformal panel on the exterior of the first vehicle. The system may comprise a second processor on the second vehicle, the second processor in communication with a virtual 3D model and in communication with the at least one RF array, the at least one optical detection aperture, and the at least one optical beam direction aperture of the at least one conformal panel on the exterior of the second vehicle. Data may be transmitted between the first and second vehicles via the optical link and the RF link. The first and second vehicles may comprise aircraft. The optical detection aperture may comprise a laser light detector and the optical beam directing aperture may comprise an agile beam laser that may be electronically maneuvered by liquid crystals. The at least one conformal panel may comprise a first plurality of conformal panels on the exterior of the first vehicle and the at least one conformal panel may comprises a second plurality of conformal panels on the exterior of the second vehicle.

One embodiment is an optical link device comprising a conformal panel and at least one RF array on the conformal panel, wherein the RF array is configured to create RF link with a second RF array. The optical link device comprises at least one optical detecting aperture on the conformal panel and at least one optical beam directing aperture on the conformal panel. The optical detecting aperture is configured to detect a laser and the optical beam directing aperture is configured to direct a laser.

The optical beam directing aperture may comprise an agile beam laser that may be electronically maneuvered by liquid crystals. The optical directing aperture may be a plurality of laser light detector positioned about the conformal panel. The RF array, optical detecting aperture, and the optical beam directed aperture may be in communication with a processor.

Figure 1:
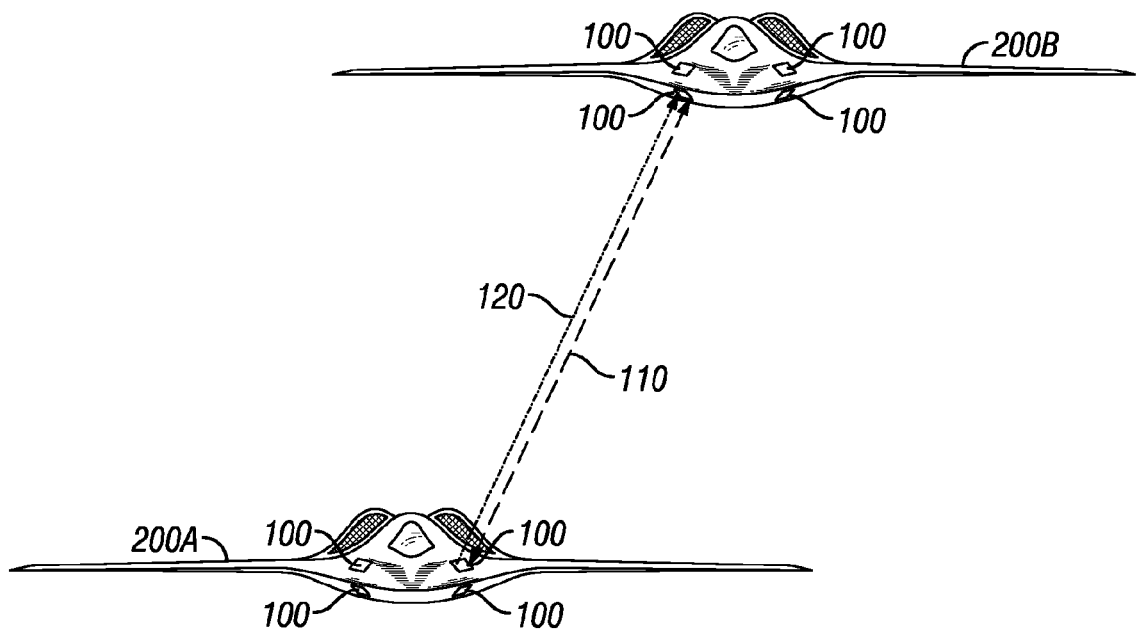
FIG. 1 is schematic of one embodiment of a system for creating a free space optical link between two vehicles.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows two vehicles, aircraft 200A and aircraft 200B, that have created a free space optical link 120 between the aircraft 200A and 200B. As discussed herein, a radio frequency (RF) link 110 has first been created between the aircraft 200A and 200B. Prior to establishing the RF link 110, the vehicles 200A and 200B have synchronized clocks between the two vehicles 200A and 200B. The synchronization of clocks may be very precise. For example, the clocks on the two vehicles 200A and 200B may be synchronized together having an accuracy precise to one billionth of a second. The RF link 110 may be easier to establish between two moving vehicles, such as aircraft 200A and aircraft 200B, than an optical link 120 between two moving vehicles as would be appreciated by one of ordinary skill in the art having the benefit of this disclosure. Once the RF link 110 has been established, information may be transmitted along the RF link 110 to help establish an optical link 120 between the moving aircraft 200A and 200B, as discussed herein.

The exterior of each vehicle 200A and 200B may include a plurality of conformal panels 100. An RF link 110 may be created between panels 100 on the two vehicles 200A and 200B. A laser 120 may then be pointed from one vehicle towards the other vehicle, as shown in FIG. 1 as the optical link 120 extending from a first aircraft 200A to a second aircraft 200B. The first aircraft 200A may then begin to move the laser 120 in a pattern and track the different positions of the laser 120 as well as recoding the time at which the laser 120 was moved to the different positions along the pattern. The pattern may be spiral pattern. The panels 100 on the exterior of the second aircraft 200B may detect the laser 120 at various positions as it is rotated through the spiral pattern.

The second aircraft 200B may then transmit the various times at which the panels 100 detected the laser 120 to the first aircraft 200A over the RF link 110. Upon receipt of the synchronized detection times from the second aircraft 200B, the first aircraft 200A may reposition the laser 120 to only those positions that were detected by the panels 100 on the second aircraft 200B. The second aircraft 200B may confirm re-detection of the laser 120 by the panels 100 on the exterior of the aircraft 200B and transfer the confirmation over the RF link 110 to the first aircraft 200A. At this point, the optical link 120 between the two vehicles 200A and 200B is established and information may be transferred along the optical link 120 as desired. Either vehicle 200A or 200B may terminate the RF link 110 once it is confirmed that the optical link 120 has been established using the optical link 120 as the sole means of transmitting information between the two vehicles 200A and 200B until the optical link 120 is broken. Upon breaking the optical link 120, the RF link 110 can be re-established if a new optical link 120 between the two vehicles 200A and 200B is desired. The direction between established the RF link 110 and optical link 120 is shown in regards to FIG. 1 for illustrative purposes only. For example, the laser 120 could originate at the second vehicle 200B and be pointed to the first vehicle 200A as would be appreciated by one of ordinary skill in the art having the benefit of this disclosure. The number and location of panels 100 on the exterior of the aircraft 200A and 200B is for illustrative purposes only and may be varied depending on the application as would be appreciated by one of ordinary skill in the art having the benefit of this disclosure.

Figure 2:
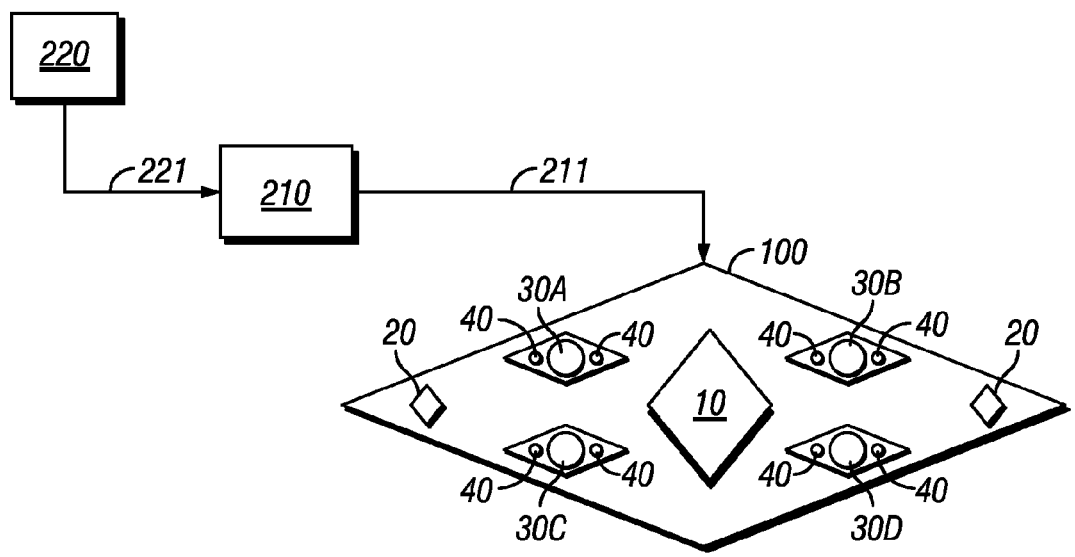
FIG. 2 shows one embodiment of a conformal panel that may be used to create a free space optical link between two vehicles.
Figure 3:
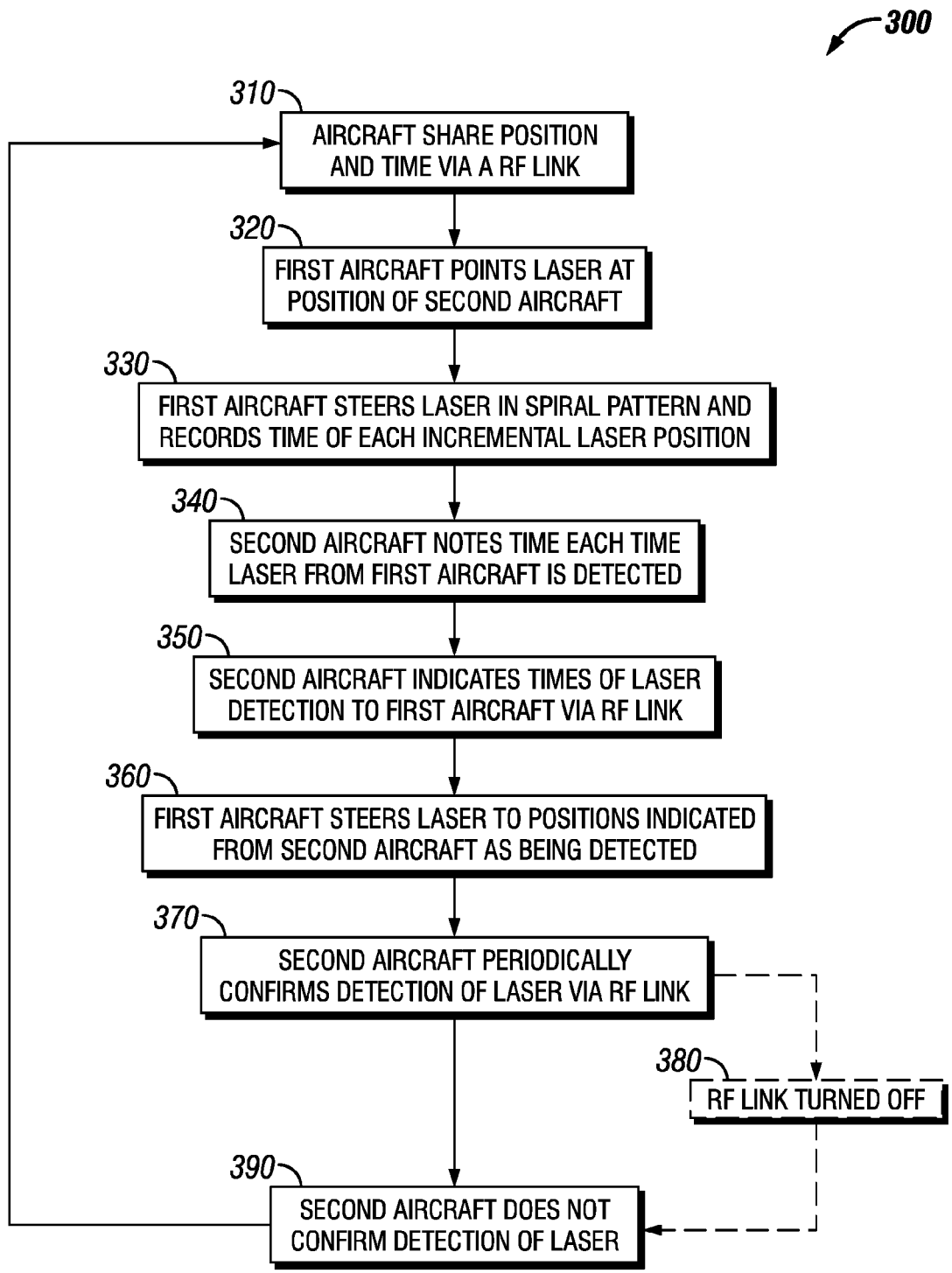
FIG. 3 is flow chart of one embodiment of a method of establishing a free space optical link.

FIG. 2 shows one embodiment of a conformal panel 100 that may be used on the exterior of a vehicle, such as an aircraft 200, to create a free space optical link as discussed herein. The panel 100 includes an active electronic scanner RF array 10 that permits two panels to establish a RF link 110 (shown in FIG. 1) between two vehicles. The RF array 10 may support point-to-point radar measurements and other RF interactions such as communications as would be appreciated by one of ordinary skill in the art having the benefit of this disclosure.

The panel may include a plurality of optical beam directing apertures 20. The optical beam directing apertures 20 may be an agile beam laser and the number and locations of the optical beam directing apertures 20 is shown for illustrative purposes only and may be varied as would be appreciated by one of ordinary skill in the art having the benefit of this disclosure. The optical beam directing apertures 20 may comprise a conformal electronically scanned laser beam director that point beams of photons supplied by onboard lasers installed remote to the panel 100. The optical beam directing apertures 20 may comprise an agile beam laser that may be electronically maneuvered via liquid crystals. The panel 100 could include other mechanisms that may be used to maneuver the optical beam as would be appreciated by one of ordinary skill in the art having the benefit of this disclosure. The optical beam directing apertures 20 are configured to move a laser beam in a spiral pattern through a number of discrete positions. As discussed herein, the time is measured and recorded as the laser is positioned in each discrete position along the pattern and this information may be transmitted via a RF link between two moving vehicles.

The panel 100 may include a plurality of optical devices 30A, 30B, 30C, and 30D and a plurality of optical detection apertures 40. The optical devices, collectively referred to as 30, may be various types of cameras and the optical detection apertures 40 may be laser light detectors. A pair of optical detection apertures 40 may be paired with each optical device 30 and may be used to detect a laser guided from another vehicle. The number, configuration, and type of optical devices 30 and optical detection apertures 40 may be varied on the panel 100 as would be appreciated by one of ordinary skill in the art having the benefit of this disclosure. Various optical devices 30 may be included on the panel 100 as would be appreciated by one or ordinary skill in the art having the benefit of this disclosure. For example, one optical device 30 may be configured to decode pixels to determine information being transmitted over an optical link from a vehicle.

Each panel 100 on an exterior of a vehicle may be connected to a central processor 210 via a communication link 211. The communication link 211 may be wireless or could be various wired configurations. For example, the communication link 211 may comprise a high-bandwidth photonic interface composed fiber-optic cable. Each panel 100 may communicate multiple types of information to the processor 210. For example, the panel 100 may communicate precision time references, sensing reference information, and optical aperture information. The central processor 210 may also be in communication via communication link 221 with a database 220 that contains a virtual 3D model. The communication link 221 may be wireless or could be various wired configurations. The virtual 3D model 220 may be used for each vehicle to determine its position as it moves with this information being relayed to another moving vehicle. This information may be used to inform a vehicle to a location to direct a RF link to initially establish a RF link between the two vehicles. While the location from the database may be sufficient to establish a RF link between the two vehicles, an optical link may be too difficult to establish solely based on this positional information due to the continued movement of the two vehicles.

The virtual 3D model may be a virtual two dimensional image tightly integrated with a virtual elevation model. Thus, a point or location within the virtual 3D model may then be located in three dimensions. When a beam from the panel 100 is pointed at locations on the real world surface based upon the vehicle's perception of its location relative to the virtual 3D model, the collected return signals reflected by the real world should match predictions using the virtual 3D model. Multiple measurements using multiple beam positions over time may be exploited to search out match errors that imply errors in the vehicles perception of its 3D location relative to the virtual 3D model. These periodic measurements may provide update aiding of the vehicle's inertial navigation system in lieu of GPS aiding.

Each panel 100 may synchronize information output from the sensing apertures with precision time references. This information may be continuously streamed in parallel between each panel 100 and the processor 210. The processor 210 may synchronize the information received for each panel 100. The time synchronization information is preserved and exploited to precisely associate panel aperture sensed information with panel sensed motion information and the panel precision time referenced system. Each vehicle may include an atomic clock that is synchronized to the official source of time for the Department of Defense (DoD). Before the vehicles leave on a mission the clocks are all synchronized to DoD time to ensure the exchange of time stamped information between vehicles will be synchronized. The clocks on the various vehicles may be calibrated or synchronized together to a precision of a picosecond.

Another approach to synchronizing the clocks is to create a network of the vehicles involved in a mission. All of the clocks of the vehicles involved in a mission are synchronized to clock of the lead vehicle on the mission. The lead vehicle may periodically measure the difference between each of the vehicle's master DoD time reference and the lead vehicle's master DoD time reference. A calibration table may then be created for each of the periodic measured differences, which may be communicated back to the vehicle with the corresponding difference.

Each panel 100 may communicate various types of information over a high-bandwidth photonic interface composed of fiber-optic cables. For example, the information may include panel precision time references system, panel motion sensing reference system, and the panel sensing apertures interface. The data output from the panel sensing apertures is time synchronized onboard the panel 100 with information output from the panel 100 with precision time references.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A system to establish a free space optical link comprising:
a first vehicle having at least one conformal panel on an exterior of the first vehicle, the at least one conformal panel comprising at least one radio frequency (RF) array, at least one optical detection aperture, and at least one optical beam directing aperture; and
a second vehicle having at least one conformal panel on an exterior of the second vehicle, the at least one conformal panel comprising at least one RF array, at least one optical detection aperture, and at least one optical beam directing aperture;
wherein a RF link may be established between the at least one conformal panel of the first vehicle and the at least one conformal panel of the second vehicle; and
wherein an optical link may be established between the at least one conformal panel of the first vehicle and the at least one conformal panel of the second vehicle.

2. The system of claim 1, further comprising a first processor on the first vehicle, the first processor in communication with a virtual 3D model and in communication with the at least one RF array, the least one optical detection aperture, and the at least one optical beam directing aperture of the at least one conformal panel on the exterior of the first vehicle and a second processor on the second vehicle, the second processor in communication with a virtual 3D model and in communication with the at least one RF array, the least one optical detection aperture, and the at least one optical beam directing aperture of the at least one conformal panel on the exterior of the second vehicle.

3. The system of claim 1, wherein data may be transmitted between the first and second vehicles via the optical link and the RF link.

4. The system of claim 1, wherein the first vehicle comprises an aircraft and wherein the second vehicle comprises an aircraft.

5. The system of claim 4, wherein the optical detection aperture further comprises a laser light detector and the optical beam directing aperture further comprises an agile beam laser that may be electronically maneuvered by liquid crystals.

6. The system of claim 5, wherein the at least one conformal panel comprise a first plurality of conformal panels on the exterior of the first vehicle and wherein the at least one conformal panel comprise a second plurality of conformal panels on the exterior of the second vehicle.

7. An optical link device comprising:
a conformal panel;
at least one radio frequency (RF) array on the conformal panel, wherein the RF array is configured to create a RF link with a second RF array;
at least one optical detecting aperture on the conformal panel;
at least one optical beam directing aperture on the conformal panel;
wherein the optical detecting aperture is configured to detect a laser; and
wherein the optical beam directing aperture is configured to direct a laser.

8. The device of claim 7, wherein the at least one optical beam directing aperture further comprises an agile beam laser that may be electronically maneuvered by liquid crystals.

9. The device of claim 8, wherein the at least one optical directing aperture further comprises a plurality of laser light detectors positioned about the conformal panel.

10. The device of claim 7, wherein the at least one RF array, the at least one optical detecting aperture, and the at least one optical beam directing aperture are in communication with a processor.

* * * * *